United States Patent [19]

Hafeli

[11] 4,056,068
[45] Nov. 1, 1977

[54] PROCESS FOR CONDITIONING FLUE GASES IN WASTE MATERIAL INCINERATION PLANTS WITH HEAT UTILIZATION

[75] Inventor: Robert Hafeli, Zurich, Switzerland

[73] Assignee: Von Roll AG, Gerlafingen, Switzerland

[21] Appl. No.: 684,557

[22] Filed: May 7, 1976

[30] Foreign Application Priority Data

July 4, 1975 Switzerland .................... 8787/75

[51] Int. Cl.² .................... F23G 5/00; F23L 9/04; F23J 5/00
[52] U.S. Cl. .................... 110/8 A; 110/72 R; 110/119
[58] Field of Search .............. 110/7 R, 8 R, 8 A, 10, 110/72 R, 75 R; 432/38

[56] References Cited

U.S. PATENT DOCUMENTS

| 1,531,673 | 3/1925 | MacKay | 110/10 |
| 2,906,516 | 9/1959 | Tinker | 432/38 |
| 3,861,334 | 1/1975 | Stockman | 110/8 |

Primary Examiner—Kenneth W. Sprague
Attorney, Agent, or Firm—Weingarten, Maxham & Schurgin

[57] ABSTRACT

A process for conditioning flue gases in waste material incineration plants with heat utilization. Secondary air is introduced into the combustion chamber above the combustion grate. The flue gases are moistened prior to entering the gas cleaner by water sprayed therein. Apparatus for performing the process is also disclosed.

12 Claims, 3 Drawing Figures

PROCESS FOR CONDITIONING FLUE GASES IN WASTE MATERIAL INCINERATION PLANTS WITH HEAT UTILIZATION

FIELD OF THE INVENTION

The invention relates to a process and apparatus for conditioning flue gases in waste material incineration plants with heat utilization, the conditioning being accomplished by introducing secondary air into the combustion chamber above the combustion grate, while the flue gases are moistened by introducing water prior to entering the gas cleaners.

DISCUSSION OF THE PRIOR ART

In the already known processes or apparatuses of this type the secondary air introduced into the combustion chamber of the furnace above the actual combustion grate serves to give the combustion gases a turbulent motion and at the same time to subsequently burn any combustible volatile constituents still contained therein within the actual combustion chamber. However, it also serves to precool the hot flue gases so that the temperature in the combustion chamber remains below the melting point of the fly ash. The waste-heat boiler, preferably constructed as a steam or hot water boiler hereby serves as a series-connected flue gas cooler and at the same time for the utilization of the sensible heat contained in the flue gases for heat recovery prior to discharging the flue gases into the atmosphere via the gas cleaners.

However, over the past few years there has been considerable changes to garbage composition, due to the constantly increasing proportion of paper and plastic wastes. In addition, in many places, industrial waste is mixed with domestic garbage and furthermore recently many inert constituents such as glass and metals have been removed from the garbage, so that its calorific value has been further increased, such value being as much as 3500 kcal/kg and even above. However, so as not to exceed the maximum permitted combustion chamber temperatures dependent on the melting point of the fly ash, excessively large quantities of air must previously have been introduced into the combustion chamber, either via individual air flues or by dividing it up into primary and secondary air and in certain cases even into tertiary air.

This increased demand for combustion and cooling air also leads to an increase in the size of the effective flue gas volume, which in turn leads to larger heat utilizers and flue gas cleaners. This results not only to undesired increases of the structural dimensions of these units, including the necessary additional equipment (exhaust fans, etc.), but also raises the equipment and operating costs. Such increased costs are a significant disadvantage, particularly in the case of the gas cleaners which are generally constructed in the form of electrostatic precipitators.

In addition, the higher combustion air requirement resulting from the increased garbage calorific value leads to a reduction of the moisture content in the flue gases, for example from a normal 10-15% (Vol. %) down to 5% and below. This in turn further impairs the dust separation in the electrostatic precipitator so that frequently the desired dust separating level cannot be achieved even when its size is increased at high cost. The fact that gas cleaning by means of electrostatic precipitators can only take place with moist flue gases having an at least 10 Vol. % water content makes it necessary that the flue gases, normally after heat emission and subsequent to their passage through the waste heat boiler, be humidified and therefore conditioned by blowing in water or steam, resulting in the installation of special apparatuses, such as humidifying towers. As is known, the garbage may also be humidified prior to entry into the combustion furnace; however, this prehumidification is difficult to control, from the point of maintaining the necessary moisture value. This measure also fails to alter the fact that in prior art incinerators of this type, an excessively large volume of air has to be introduced into the combustion chamber so that the maximum permitted combustion chamber temperature of 900° to 1000° C is not exceeded.

SUMMARY OF THE INVENTION

The present invention aims at obviating these disadvantages. The invention is a process of the type defined hereinbefore, wherein a regulatable quantity of water is blown into the reduction-oxidation zone of the combustion chamber together with and through the secondary air. By this means an oxygen excess sufficient for the subsequent burning of unburnt material is introduced into the combustion chamber, the CO-oxidation of the unburned material is catalytically accelerated by a homogeneous water gas reaction and simultaneously the laminar flow of the combustible gases is converted into a turbulent flow for mixing the gases in the combustion chamber. Also a predetermined maximum gas temperature and a water content of at least 10 Vol. % is maintained in the flue gases prior to their discharge from the combustion chamber.

The invention further includes an apparatus for performing the process, wherein at least one mixing nozzle for the secondary air and the water is provided in at least one of the two furnace side walls. Such mixing nozzles are also provided in the heat reflection wall of the combustion furnace overlying the final combustion zone of the combustion grate.

BRIEF DESCRIPTION OF THE DRAWING

The objects, features and advantages of the present invention will be apparent from the following description when read in conjunction with the accompanying drawing in which.

DETAILED DESCRIPTION OF THE PREFERRED EMBODIMENTS

Figure 1:
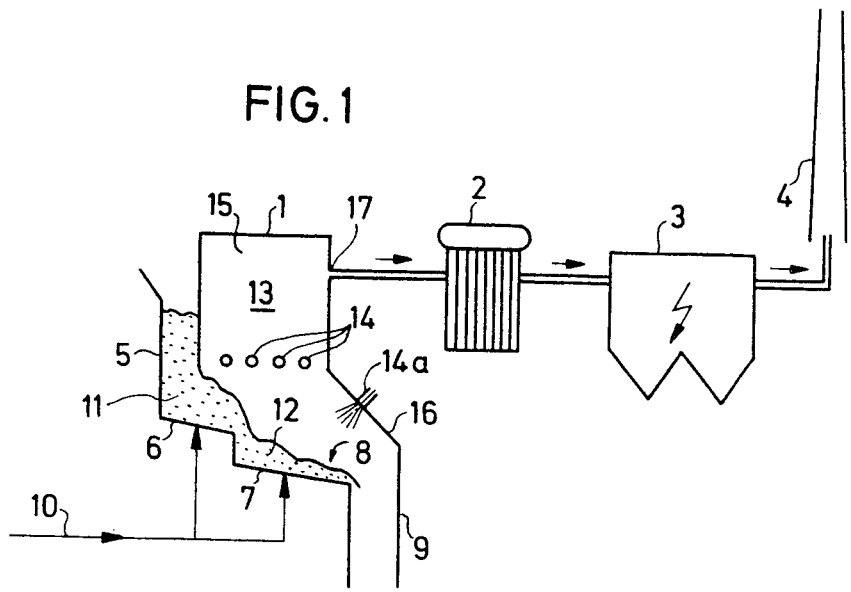
FIG. 1 is a garbage incineration plant with a series-connected waste heat boiler for heat utilization purposes and a following electrostatic precipitator, in a longitudinal section through the plant.

With reference now to the drawing, FIG. 1 shows a garbage incineration plant which substantially comprises a combustion furnace 1, a waste heat boiler 2 connected in series therewith, boiler 2 simultaneously serving as a flue gas cooler, a flue gas cleaner 3 such as an electrostatic precipitator connected behind boiler 2, and a flue 4. The municipal garbage with which can be mixed industrial waste, and even industrial garbage alone, is introduced into the combustion furnace 1 via a hopper 5. A preliminary grate 6, in addition to predrying, serves for initially heating and igniting the garbage. The actual combustion grate 7 is connected to the preliminary grate. After passing through a final combustion zone 8 the combustion residue of the garbage falls into a slag pit 9, from where it is removed as burnt out slag. Primary air serving as cold or pre-heated combustion air is supplied to furnace 1 by means of a pipe 10, from which a portion of the primary air is fed beneath the predrying grate 6 and is blown through the layer of garbage 11 located upon the same, serving to both dry and ignite the garbage. The remaining portion of the primary air is blown through the combustion grate 7, and the dried, ignited and already partly carbonized layer of garbage 12 located thereupon and on into the combustion chamber 13 of combustion furnace 1.

A series of mixing nozzles 14 for secondary air and water, constructed as two material nozzles, are here arranged in a horizontal series in at least one of the two sidewalls 15 of furnace 1 above garbage layer 11,12 in the reduction-oxidation zone. One or several additional mixing nozzles 14a are here incorporated in a heat reflection wall 16 of furnace 1, which overlies the final burning zone 8 of combustion grate 7. An embodiment of the mixing nozzles 14 or 14a is shown schematically in FIG. 3. In order that the gas temperature in combustion chamber 13 does not rise above a maximum permitted temperature, normally 900° to 1000° C, and in order to obtain an optimally oxidized flue gas mixture, wherein the flue gas volume is only minimally increased, an accurately metered quantity of water is sprayed in finely dispersed form into the combustion chamber 13 together with secondary air via mixing nozzles 14 and 14a arranged at carefully selected points. Secondary air and water are thus injected in such a way that in uniform distribution an oxygen excess adequate for subsequent burning is obtained, that CO-oxidation is catalytically accelerated in accordance with the homogeneous water gas reaction, that the laminar flow of the combustible gases is effectively destroyed, that a point 17 of the flue gas discharge from the combustion chamber 13 an average gas temperature of 900° to 1000° C can be maintained, and that the flue gases are conditioned to such an extent on leaving the furnace that their water vapor proportion is at least 10 Vol. %.

The residence time of the flue gases in combustion chamber 13 is selected in such a way that the previously described conditions are completely fulfilled, whereby even the largest water droplets sprayed into the combustion chamber 13 are fully evaporated. Such desired conditions are generally achieved in about 2 seconds. The spraying-in of the water with the secondary air is selected in such a way that in combustion chamber 13 there is neither local undercooling nor overheating. This can be effectively prevented by a graded water supply, depending on the installation point of the mixing nozzle. As a result optimally oxidized flue gases are obtained, containing at least 10 Vol. % of water. Furthermore, the maximum permitted flue gas temperature of 900 ° 1 to 1000° C is reliably maintained. In other words the conditions obtained by the process and apparatus of this invention are substantially optimum for garbage incineration plants, both for the purpose of heat recovery of boiler 2 and for gas cleaning in electrostatic precipitator 3.

The spraying-in of water by means of the secondary air, at a rate of 0.1 to 0.3 kg of water/Nm³ of air, in a quantity variably adapted according to the positioning of the nozzles within the incinerator, leads to a slight increase in the waste gas volume as a result of this air supply, but still leads to a considerable reduction thereof compared with the hitherto sole injection of secondary air. The thus obtained reduction of the effective total flue gas quantity at gas outlet 17 results in correspondingly smaller plant parts both in connection with waste heat boiler 2 and electrostatic precipitator 3, which in turn reduces both equipment and operating costs.

Figure 2:
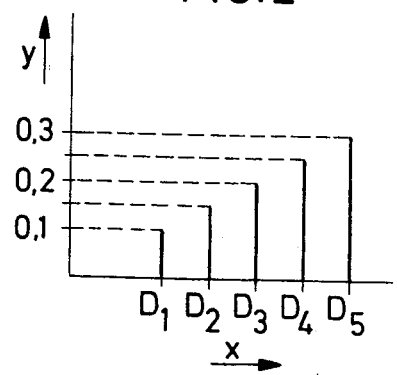
FIG. 2 is a diagram showing the water content of the secondary air as a function of the distance of the spraying-in point from the garbage inlet.

In the graph of FIG. 2 the distance of the particular injection point from the garbage inlet entered as the abscissa on the x-axis is related to the relevant water content of the secondary air in kg/Nm³ as the ordinate on the y-axis. The injection points $D_1$ and $D_4$ are associated with the mixing nozzles 14 of the furnace sidewall or walls 15 arranged at the same height as shown in FIG. 1, whereas the injection point $D_5$ of the mixing nozzle or nozzles 14a is positioned in the heat reflection wall 16. The associated water contents (at points $D_1$ to $D_4$) are shown in the range of 0.1 to 0.2 kg/Nm². The quantity of water sprayed in by the first mixing nozzle 14 at point $D_1$ (the closest to hopper 5) is about 0.1kg/Nm³ and the quantity of water sprayed in by the fourth mixing nozzle 14 at point $D_4$ farthest from hopper 5 is about 0.25 kg/Nm³. The quantity of water injected at point $D_5$ via the heat reflection wall nozzle or nozzles 14a is about 0.3 kg/Nm³. Thus in the diagram of FIG. 2, the specific water quantity increases in approximtely linear manner as the distance increases between the spraying-in point and the garbage inlet. However, the quantity of water in kg/Nm³ of secondary air relative to the individual mixing nozzle 14 and 14a need not be as shown in exemplified manner in FIG. 2, but can in fact be the same for each nozzle. However, it must always be selected in such a way that the above-mentioned optimum gas characteristics are ensured when the flue gases leave combustion chamber 13.

Figure 3:
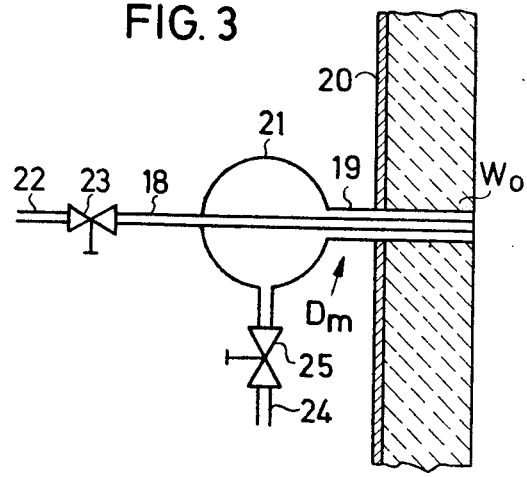
FIG. 3 schematically shows in a longitudinal section a mixing nozzle for air and water constructed as a two-substance nozzle.

FIG. 3 shows schematically and in longitudinal section, a mixing nozzle $D_m$ for secondary air and water. A jet tube 18 for the water is arranged within a jet tube 19 for the secondary air, so as to be coaxial to the longitudinal central axis thereof. The secondary air jet tube 19 passes through a furnace wall, generally designated by Wo. This can be one of the two furnace sidewalls 15 or the reflection wall 16 serving as the furnace rearwall. The wall can also include a furnace plate 20 fixed externally to the furnace wall Wo. Tube 19 is connected to an air distributor 21 extending perpendicular thereto. The water jet tube 18 passes through the air distributor 21 and is connected to a water pipe 22, which is provided with a regulating valve 23. The secondary air is supplied to air distributor 21 via an air pipe 24, which is in turn equipped with a regulating member 25. A plurality of mixing nozzles $D_m$ can be arranged in a row connected to air distributor 21 in the longitudinal direction thereof corresponding to sidewall nozzles 14 in FIG. 1 to provide a nozzle system.

The various mixing nozzles, both 14 and 14a, can be connected to a joint main air pipe on the air side in front of the appropriate regulating members (25 in FIG. 3). The regulating valves 25 and 23 for water and air respectively permit an independent quantity regulation. Furthermore, in the case of each individual mixing nozzle, the water and air quantities can be regulated independently of one another and also independently of the corresponding quantities in the case of the other mixing nozzles. However, it is also possible to jointly adapt the valves as necessary for the air and water volume from a central regulating device to accommodate the particular operating conditions in combustion furnace 1 by means of specific regulating operation. Furthermore, the secondary air and water supply can be regulated as a function of predetermined rated values for the flue gas discharged from the combustion chamber to maintain the average flue gas temperature in the range of 900° to 1000° C and the oxygen and water content (the latter of 10 Vol. % or above) by means of a programmed closed circuit. When burning garbage or industrial waste with a low calorific value, the water is injected in vapor form in order to keep the cooling of the flue gases low, so that they still have a sufficiently high temperature in the series-connected heat utilizer 2.

The advantage of the above-described process for flue gas conditioning in incineration plants for municipal and/or industrial garbage with heat utilization is that, as a result of the regulatable interruption of secondary air and filter injection and the selective introduction at the most suitable point, while ensuring excellent incineration conditions, an optimum gas conditioning is achieved. By this means, apart from complying with the now stringent legal requirements concerning the discharge of flue gases into the atmosphere, the waste gas boiler which serves as the heat utilizer and the series-connected electrostatic precipitator, can not only be given smaller structural dimensions, but also the initial and operating costs for these two plant parts become lower.

The invention is not limited to the embodiments described and represented hereinbefore and various modifications can be made thereto by those skilled in the art which are within the scope of the invention.

What is claimed is:

1. A process for conditioning flue gases in waste material incineration plants with heat utilization having a combustion chamber with a combustion grate, sidewalls and a reflection wall, a flue gas cooler serving as the heat utilizer and a gas cleaner connected in series with said combustion chamber, said process comprising the steps of:

introducing secondary air into said combustion chamber above the combustion grate and before said flue gas cooler at a plurality of injection points located at the same height through at least one of the two furnace sidewalls and through said reflection wall; and spraying water into said flue gases to moisten them before they enter said flue gas cooler at said plurality of injection points;

said water and secondary air being regulatably introduced together into the reduction-oxidation zone of the combustion chamber thereby creating an oxygen excess sufficient for the subsequent burning of unburned combustible volatile material in said flue gases, the CO-oxidation of the unburned material is catalytically accelerated by a homogeneous water gas reaction and simultaneously the laminar flow of the combustible gases is converted into a turbulent flow to facilitate mixing the gases in the combustion chamber, and whereby a predetermined maximum gas temperature is maintained, and a flue gas water content of at least 10 Vol. % is maintained prior to its discharge from the combustion chamber.

2. A process for conditioning flue gases in waste material incineration plants with heat utilization having a combustion chamber with a combustion grate, a flue gas cooler serving as the heat utilizer and a gas cleaner connected in series with said combustion chamber, said process comprising the steps of:

introducing secondary air into the reduction-oxidation zone of said combustion chamber above the combustion grate and before said flue gas cooler;

spraying water into said reduction-oxidation zone to moisten the flue gases before they enter said flue gas cooler, said water being sprayed into said reduction-oxidation zone simultaneously with the introduction of said air; and maintaining said air and water in a separate, unmixed condition prior to their introduction into said reduction-oxidation zone;

said water and secondary air being regulatably introduced together into the reduction-oxidation zone of the combustion chamber thereby creating an oxygen excess sufficient for the subsequent burning of unburned, combustible, volatile material in said flue gases, the CO-oxidation of the unburned material is catalytically accelerated by a homogeneous water gas reaction and simultaneously the laminar flow of the combustible gases is converted into a turbulent flow to facilitate mixing the gases in combustion chamber, and whereby a predetermined maximum gas temperature is maintained, and a flue gas water content of at least 10 Vol. % is maintained prior to its discharge from the combustion chamber.

3. The process according to claim 2 wherein the predetermined maximum flue gas outlet temperature is in the range of 900 to 1000° C.

4. The process according to claim 2 wherein the secondary air and water are blown into the combustion chamber at a plurality of injection points located at the same height through at least one of the two furnace sidewalls and through said reflection wall.

5. The process according to claim 2 wherein the water is injected in vapor form.

6. The process according to claim 2 wherein at each injection point the quantity of secondary air and water introduced into the combustion chamber is independently adjustable.

7. The process according to claim 2 wherein the secondary air and water quantity introduced into the combustion chamber is regulated by means of a programmable closed circuit as a function of predetermined rated values of temperature and moisture content for the discharge of flue gases from the combustion chamber.

8. The process according to claim 6 and comprising the further step of adjusting the volume of water with respect to the volume of secondary air injected further with respect to the distance of the respective introducing means from the waste material inlet into said combustion chamber.

9. Apparatus for conditioning flue gases in waste material incineration plants with heat utilization having a combustion chamber with a combustion grate, sidewalls and a reflection wall, a flue gas cooler serving as the heat utilizer connected at the gas discharge of the combustion chamber, and a gas cleaner connected in series with said combustion chamber and said gas cooler, said apparatus comprising:

a conduit adapted for connection to a source of secondary air;

a conduit adapted for connection to a source of water;

at least one first mixing nozzle opening into said combustion chamber from at least one of said side walls;

at least one second mixing nozzle opening into said combustion chamber from said reflection wall, said reflection wall overlying the final combustion zone of said combustion grate; and means for connecting both said water and secondary air conduits to said first and second mixing nozzles for injection thereof into said combustion chamber;

whereby an oxygen excess sufficient for the subsequent burning of unburned combustible volatile material in said flue gases is provided, the CO-oxidation of the unburned material is catalytically accelerated by a homogeneous water gas reaction, the laminar flow of the combustible gases is converted into a turbulent flow to facilitate mixing the gases in the combustion chamber, a predetermined maximum gas temperature is maintained, and a flue gas water content of at least 10 Vol. % is maintained prior to its discharge from the combustion chamber.

10. The apparatus according to claim 9 wherein each of said mixing nozzles comprises a jet tube for the secondary air and a jet tube for the water arranged coaxially therein.

11. The apparatus according to claim 9 and further comprising:

an air distributor;

wherein a plurality of first and second mixing nozzles are combined to form a nozzle system and said nozzle conduits for the secondary air are connected to said air distributor.

12. The apparatus according to claim 11 wherein each of said water conduits passes through said air distributor in airtight manner.

* * * * *

UNITED STATES PATENT AND TRADEMARK OFFICE
CERTIFICATE OF CORRECTION

PATENT NO. : 4,056,068
DATED : November 1, 1977
INVENTOR(S) : Robert Hafeli

It is certified that error appears in the above-identified patent and that said Letters Patent are hereby corrected as shown below:

Column 3, line 60, "900°I to 1000°C" should read --900° to 1000°C--.
Column 4, line 15, "$D_1$ and $D_4$" should read --$D_1$ to $D_4$--;

line 21, "$Nm^2$" should read --$Nm^3$--.

Signed and Sealed this

*Eleventh* Day of *April 1978*

[SEAL]

*Attest:*

RUTH C. MASON
*Attesting Officer*

LUTRELLE F. PARKER
*Acting Commissioner of Patents and Trademarks*